Nov. 14, 1939.   M. ERNST ET AL   2,179,547
DRIVE SYSTEM FOR GAS ELECTRIC AUTOMOBILES
Original Filed June 20, 1932   2 Sheets-Sheet 2
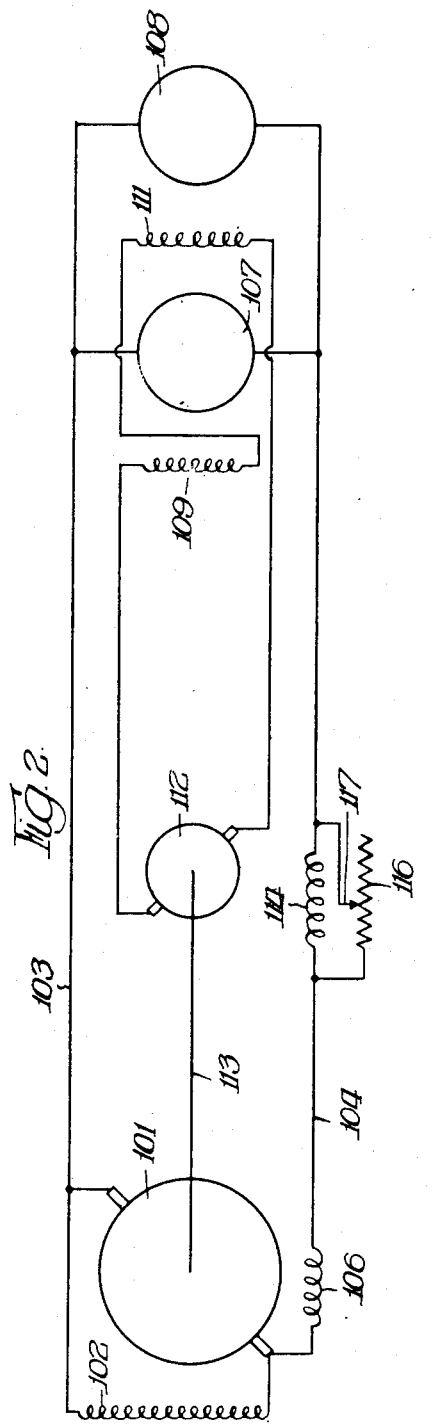
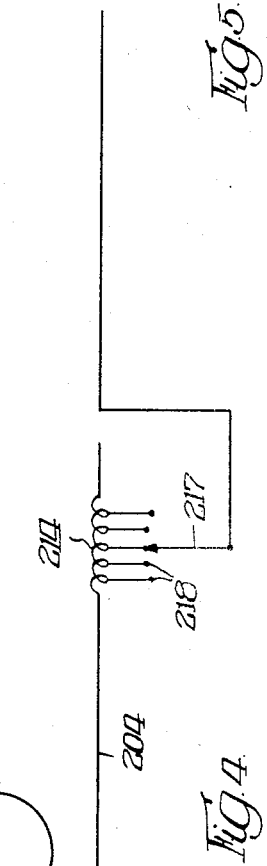
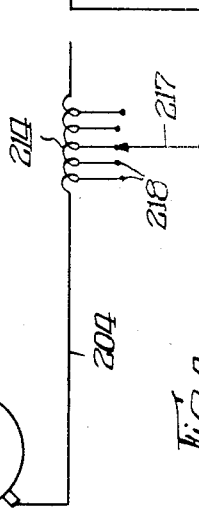
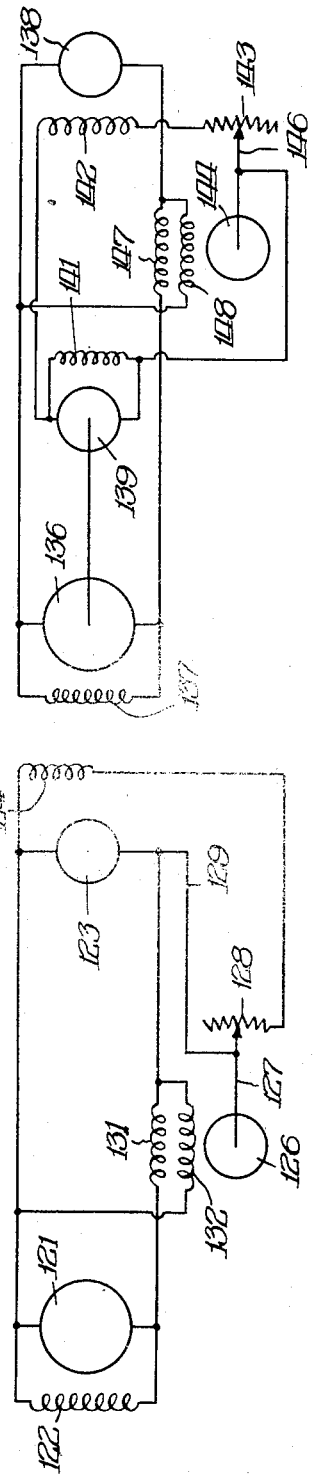
Inventors:
Matthew Ernst,
Harry B. Holthouse,
By Mueller & McLaughlin
Attys.

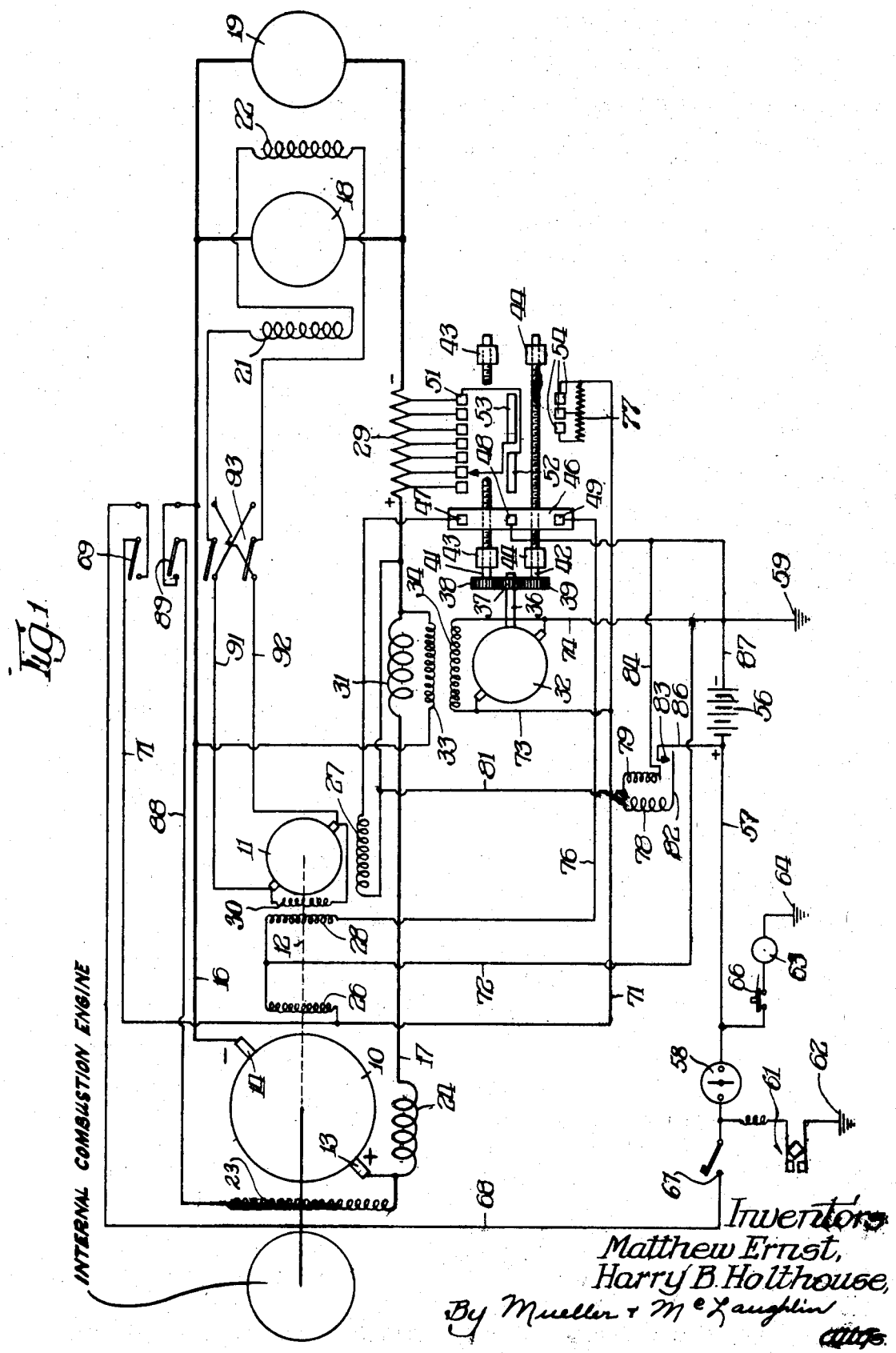

Patented Nov. 14, 1939

2,179,547

UNITED STATES PATENT OFFICE 2,179,547

DRIVE SYSTEM FOR GAS ELECTRIC AUTOMOBILES

Matthew Ernst and Harry B. Holthouse, Chicago, Ill.; The Northern Trust Company, executor of said Matthew Ernst, deceased, said company assignor to The Northern Trust Company, Chicago, Ill., a corporation of Illinois Application June 20, 1932, Serial No. 618,158
Renewed April 20, 1939

34 Claims. (Cl. 172—239)

Our invention relates in general to mechanical electric drive systems. It relates more in particular to a drive system for a gas electric automobile in which the circuit is automatically controlled for providing the most advantageous characteristics at all phases of the operation of the system including starting and running at relatively high speeds.

In our co-pending application, Serial No. 537,706, filed May 15, 1931, we describe a gas electric drive system by means of which the most desirable characteristics of a series wound motor and the most desirable characteristics of a shunt wound motor are obtained in the same system. In this system we obtain a heavy starting torque which may be controlled to provide what is in effect a super-series starting torque, while the stability at higher speeds which are successfully used with shunt motors are also obtained. We also obtain the safety features of the shunt wound motor in that with extreme light loads as, for example, when a drive wheel is permitted to slip, it will be impossible for the motor to run away with itself. In this respect, the system gives the same effect as a straight shunt wound motor in that a counter E. M. F. is built up by the armature which limits the speed at which the motor turns.

In the embodiment described in the prior application, considerable was left to the skill of the operator in controlling the system to obtain the best results in starting and in running. We have now found that it is possible to control the system automatically throughout so that the most desirable starting characteristics are provided and the most desirable running characteristics automatically develop as the speed of the vehicle increases.

The principal object of our present invention is to improve a system as disclosed in our co-pending application.

Another object is to control a system of this type automatically to provide high torque characteristics in starting and relatively low torque characteristics capable of high speed operation as the load is decreased.

Other objects and features of the invention will be apparent from a consideration of the following detailed description taken with the accompanying drawings, wherein:

Fig. 1 is a diagrammatic representation of the circuit and control means employed therewith;

Fig. 2 shows the simplified basic circuit employed;

Fig. 3 is a portion of the circuit showing modification thereof.

Fig. 4 is a simplified circuit showing the manner in which the control means may be applied for controlling an ordinary shunt wound self-excited motor; and Fig. 5 is still another view showing the use of the control motor for controlling the motor field when a separately excited motor is employed.

According to the general features of the invention, we provide a main generator and an auxiliary generator, both driven directly from a gasoline engine. Wheel driving motors are provided, the armatures of the motors being supplied with current from the main generator and the fields of said motors supplied with current from the auxiliary generator, which may be termed the exciter. The main generator has a shunt field, an accumulative series field and a battery field operating in relationship with each other in a manner to be described. The exciter is provided with an auxiliary battery field and with a main field in series with the main generator armature circuit. The exciter may or may not have a shunt field as determined by the design of the system.

The current in the series field of the exciter determines to a large extent the value of the motor fields and so we provide automatic means for controlling the main exciter field as determined by the motor load conditions in the generator circuit. When the load is heavy, the potential drop applied to the exciter field is relatively great which results in delivering a relatively heavier current to the motor fields. As the speed of the vehicle is increased and the load on the motor correspondingly decreased, the potential drop applied to the exciter field is decreased. This is accomplished automatically and as an incident to the changed load conditions of the system. As a result, the motor field current is decreased. thus providing the most desirable running conditions for the motors. The automatic control means is also effective to control the exciter series field and the auxiliary or battery field as well as to control the battery charging.

Now referring more in detail to Fig. 1 of the drawings, we show a main generator armature 10 and an exciter armature 11 shown schematically mounted on the same shaft 12, which shaft 12 is directly connected to an internal combustion engine (not shown). Armature brushes 13 and 14 are connected to conductors 16 and 17 which furnish the armature current to the driving motors. The motors are shown having armatures 18 and 19 and shunt type field windings 21 and 22 respectively which are preferably separately excited. The fields are energized by a separate circuit supplied with current from the exciter armature 11 as will be shown.

The main generator employs a shunt field 23 and an accumulative series field 24, and an auxiliary battery field 26. The exciter has a field 27 in series with the main generator armature circuit and a battery field 28, the excitation of which is governed by the automatic control. The exciter may or may not have a shunt field 30.

With the basic circuit hereinabove described, the current produced by the exciter armature is controlled by governing the ampere turn value of the fields 27 and 28. This can be accomplished directly by cutting out turns in the field 27 as indicated in Fig. 3; or it may be accomplished as in Fig. 2 in which the entire field coil remains connected directly in the armature circuit and a variable resistance is shunted around this field to modify the voltage drop across the terminals of the field. In general, neither the arrangement of Fig. 3 nor the arrangement of Fig. 2 is as satisfactory as that shown in Fig. 1, in which the field 27 is in parallel with an adjustable resistance 29, which is in series with the main armature circuit. An inductively wound resistance 31 is also connected in series with the main generator armature circuit and is used as a field for the automatic control motor. By controlling the value of the resistance 29, it is clear then that the electrical value of the field 27 may be controlled.

Now considering more particularly the automatic control, we provide a separate motor of relatively small size having an armature 32 and a compound field including a potential coil 33 connected across the main generator armature circuit and the coil 31, which may be termed a current coil, connected, as previously described, directly into the armature circuit in series therewith. We also provide a third field coil 34 connected to battery. The coils 31 and 33 are in opposed relationship so that the dominating one will drive the armature in one direction, while when the opposite coil dominates, the armature will be driven in the opposite direction.

The armature 32 has an armature shaft 36 bearing a pinion 37 which pinion 37 meshes with gears 38 and 39 carried on shafts 41 and 42 respectively. These shafts are journalled as at 43 and 44 in a suitable portion of the supporting frame (not shown). These shafts are provided with threads and a contact bar 46 threaded on the shafts is adapted to be moved along the shafts in either direction in response to the turning thereof. Bar 46 has contact segments 47, 48 and 49. The segment 47 is adapted to engage one of a number of taps 51 of the resistance 29. The segment 48 is adapted to engage either one of a pair of strips 52 or 53; and the segment 49 is adapted to make electrical contact with segment 54.

Considering now the segment 47 and the taps 51, it is clear that when the segment 47 is in contact with the furthest tap 51 to the left of Fig. 1 substantially all of the resistance will be cut out of a portion of the circuit including the series coil 27. At this position field 27 has the minimum voltage drop from 29 applied to its terminals. When the segment 47 is at the extreme right substantially the entire resistance 29 is in the circuit which applies the maximum voltage drop from 29 to its terminals. The position at the right is the starting position while the position at the left is the running position. This position is automatically controlled by the operation of the fields 31 and 33 as the electrical characteristics in the circuit change due to the changed load conditions on the motors.

Now considering the further operation of the vehicle, we provide a battery 56 which supplies current to the field coils 26 and 28 and is also employed for starting the internal combustion engine and also to operate the ignition system. We show the positive side of the battery connected by conductor 57 to a battery switch 58. The negative side of the battery is connected to ground at 59. The ignition apparatus indicated by the breaker 61 but not shown in detail is also adapted to be connected through the ground at 62. Those skilled in the art will understand, of course, that an ignition system employing a wire return instead of a ground return may be connected to opposite sides of the battery in the same way. Connected with the conductor 57 we also provide a starting motor 63 having one side connected to ground at 64, the opposite side controlled by a switch 66 to connect it with the conductor 57. A switch 67, operated by the vacuum from the intake manifold of the internal combustion engine, is connected as shown in a main line supplying the battery excited fields so that at idling speed the battery is cut off of the fields.

A conductor 68, a continuation of conductor 57, connects by a hand control switch 69 to a conductor 71. This conductor leads to one side of the auxiliary battery field coil 26 and a conductor 72 leads from the opposite side of the coil to the negative side of the battery.

Battery is also supplied to field coil 34 by a circuit including conductor 71, a conductor 73, the coil 34 and conductor 74 back to negative battery.

The auxiliary exciter field coil 28 is supplied with battery in a circuit including the conductor 71, one of the segment contacts 54, segment 49, conductor 76 on a positive side of the battery, field coil 28 and conductor 72 back to the negative side of the battery.

Looking now at segments 54, a resistance 77 is provided, opposite ends of which are connected to two segments 54 while the middle segment 54 is connected intermediate the ends of the resistance. When the segment 49 is on the right hand segment 54, the resistance 77 is cut out entirely and substantially full battery voltage is applied on the auxiliary exciter field coil 28. As the segment 49 moves to the left, however, resistance is cut into the circuit until finally all of the segments 54 are out of contact with the segment 49 and the battery field is entirely eliminated in the exciter.

For charging the battery, we provide a series coil 78 and a shunt coil 79. Terminals of both coils are connected to the main generator armature circuit by conductor 81. Both coils are connected to have an effect upon an armature 82 which when actuated engages a contact point 83. The shunt coil 79 is connected by conductor 84 to segment 48. This segment 48 is adapted to engage through the strip 52 or the strip 53. Strip 52 is connected at the right hand tap 51 while the strip 53 is adjustably connected to a tap toward the left hand side, or in such a way as to cut out the resistance in the circuit. This circuit including the shunt coil 79 is the control circuit for the battery and when the potential drop across the terminals of the circuit including the shunt coil 79 is sufficiently great, the armature 82 will be actuated to engage the contact 83 and establish a battery charging circuit. This includes conductor 81, series coil 78, conductor 82, contact 83 and a conductor 86 on one side of battery. The opposite side of battery is a conductor 87 which joins conductor 84 to contact with segment 48, one of the sliding contacts 52 or 53 and one of the taps 51. A charging of the battery is effected, of course, by the potential drop across the resistance 29 cut into the battery charging circuit. When the voltage is decreased below the battery voltage, the current flow tends to be in an opposite direction reversing the polarity of the current coil 78 and allowing the armature 82 to break the contact at 83 and cut the battery out of the charging circuit. Thus the battery is automatically charged at all times in which there is an adequate potential drop across the terminals thereof sufficient to affect the battery.

Now considering the control of the circuit further, we provide a compound manually operated switch of which the switch previously referred to as number 69 forms a part. The main generator shunt field 23 has one side directly connected with the brush 13, the opposite side connected to a conductor 88 and thence through a switch 89 to the negative side of the armature circuit. The motor field coils 21 and 22 shown in series are connected to the exciter armature 11 by conductors 91 and 92 by means of a switch 93 shown somewhat schematically. The fields may be connected into the exciter armature circuit for either direct or reverse drive. This is done, of course, by changing the direction of current flow in the fields by means of the switch 93 to reverse the polarities thereof.

Now considering the operation of the system, the main generator armature 10 turned directly by the engine generates an E. M. F. principally through the action of the shunt field 23 and the series field 24. The auxiliary battery field 26 has a purpose, in that at times, due to the development of a counter E. M. F. in the motors, there may be a sufficient flow of current back into the generator through the coil 24 to reverse the residual magnetism in the generator field. If the polarities of this field were definitely reversed, the E. M. F. developed by the armature would be built up in an opposite direction. The auxiliary battery field tends to prevent such a possibility and also has some value in quick starting when the series and shunt fields are of relatively low value.

The exciter shunt field 30 may be omitted entirely in many installations depending upon the value of the series coil 27 and the auxiliary battery field 28. In systems which we have operated with very great satisfaction, we have dispensed with the exciter shunt field 30.

Now assuming the internal combustion engine has been started, the main switch including the switches indicated at 69, 89 and 93 is closed when the internal combustion engine is speeded up, E. M. F. is generated in the main generator armature circuit and the exciter also generates the E. M. F. to supply the fields 21 and 22. At starting, the motors carry a relatively heavy load and as a result, the voltage in the generator armature circuit is relatively low and the amperage relatively high. The opposed coils 31 and 33 at this time operate the armature 32 to move the bar 46 to the extreme right hand of Fig. 1. Through the segment 47, substantially all of the potential drop of resistance 29 is applied to field 27. This increases the number of ampere turns in this field and so causes the exciter to produce a relatively heavy current for the fields 21 and 22. Although the motors are substantially shunt wound in their characteristics, by this means series starting characteristics can be obtained, for the reason that the armature and field currents both increase in value under heavy load conditions. By our arrangement, what might be termed super-series characteristics can be obtained in that when the armature current is doubled, the field may be increased four times thus increasing the torque eight to one whereas under comparative conditions with a series motor, the torque would be increased only four to one.

A better understanding of the operation and effect of the control motor 32 can perhaps be gained by assuming that the vehicle is operating under heavy load conditions and at a speed such that contact 47 is on say the fifth tap from the right hand end of the various taps 51. If we now assume that the vehicle runs onto a steeper hill so that the load is increased and the vehicle speed is decreased, this will of course cause the armature current to increase because the system has series characteristics by virtue of the fact that field coil 27 is connected in the armature circuit. It will follow that the increased armature current will result in an increased field current, first for the exciter 11 and then for the motor fields 21 and 22. This is true even disregarding the control motor 32. This series characteristic alone greatly reduces the increase of armature current, but nevertheless as the vehicle goes slower and slower the armature current would become greater and greater and the system would become less and less efficient.

Although series characteristics are not enough to prevent this increase of armature current with a consequent decrease in efficiency, the control motor 32 does have such effect. Assuming that the coil 33 remains constant, an increase of armature current will increase the strength of coil 31 and cause the control motor 32 to rotate in a direction which, by increasing the field strength, tends to decrease the armature current. The rotation of control motor 32 in the current decreasing direction continues until the armature current has been decreased to the point where coil 31 no longer overbalances coil 33. In other words, whenever the current exceeds a predetermined value, coil 31 overbalances coil 33 until the rotation of control motor 32 brings the current back to the predetermined value. It should be mentioned that the predetermined value is not necessarily always exactly the same since it is influenced somewhat by the varying conditions of the coil 33.

As a matter of fact, the voltage coil 33 cooperates with coil 31 to produce the same result. Thus, at the same time that the motor current rises beyond the desired value it tends to cause the generator to slow down. This causes a reduction in the voltage generated with the result that the strength of voltage coil 33 is reduced and therefore it is more greatly overbalanced by coil 31 than if it had remained constant.

An inherent and important advantage of this system is that it tends to keep the speed of the engine which drives the generators constant at an efficient value. Thus whenever the load conditions cause the speed of the engine to drop below this value the strength of the potential coil 33 is weakened, thus permitting the other coils to cause the control motor to rotate in a current decreasing direction until the current load on the generator permits it and the engine driving it to regain their desired speed.

As the vehicle increases in speed and the load on the motors is decreased, the armature 32 influenced by the field 33 gradually changes the voltage drop taps of 29 wherein resistance 29 is acting as a potentiometer whose voltage steps vary in accordance to current in armature circuit thereby decreasing the field current producing the most satisfactory running characteristics. The battery field is also cut out so that except on extremely heavy loads, there is no battery field on the exciter at all.

The operation of the battery charging circuit during this time appears clear. Through the arrangement of the sliding contacts 52 and 53 when the maximum current is being generated by the exciter, the battery is connected to have a relatively small portion of resistance 29 connected across its terminals in the battery charging circuit. As the exciter current decreases and the speed of the vehicle increases, the entire charging resistance is cut across the terminals of the battery to secure the maximum voltage drop across resistance 29. This is figured to give the most desirable charging characteristics and may be arranged so that it is impossible to overcharge the battery under normal operating conditions.

As far as the use of the auxiliary battery field in the exciter is concerned, it may be considered as merely a compensation for the loss of R. P. M. in the gas motor due to heavy starting load. Assume a two thousand R. P. M. gasoline engine having its greatest torque at seven hundred R. P. M. In a situation of this kind, the exciter would be designed as a fifteen hundred R. P. M. generator. When starting, the speed of the gas engine will be relatively low, say at about seven hundred R. P. M., assumed to be the speed of greatest torque. The auxiliary battery field therefore may be calculated to give at seven hundred R. P. M. substantially the same generator characteristics as obtained at fifteen hundred R. P. M. without the battery field.

The function of the battery excited field winding 34 in the control motor is to turn the motor armature 32 back to a position wherein the maximum potential drop of resistance 29 is applied to field 27 of the exciter. This is the position which provides the maximum amount of excitation for the exciter field winding for slow or starting speeds when the greatest torque in the driving motors is required. Without this battery excited winding 34, the armature would turn when the operator started the vehicle automatically to provide the best starting characteristics. This might require a short length of time however. The battery excited winding avoids this necessity and so no matter what the position of the control mechanism when the vehicle is stopped, it is always in a position to start with maximum torque. Not only is the main field winding 27 increased in value by this movement of the controls but the battery is also directly connected across the terminals of the auxiliary battery excited field 28 of the exciter to add to the effect of the main exciter field at slow starting speeds.

As a rule, the main switch will be left closed by the operator of the vehicle unless the entire system is to be shut off for some considerable length of time. If the vehicle is left standing with the motor idling, there will be no loss of battery current by reason of the battery being connected across the terminals of the auxiliary exciter field winding 28 because at motor idling speeds, the vacuum switch 67 will open the entire battery circuit connected with the mechanical electrical drive system. As shown, however, the starting motor and ignition circuit are not affected by the vacuum switch.

In Fig. 1, we describe the most practical electrical means of controlling the current delivered to the exciter field winding 27. The mechanical means employed in connection with the electrical system may, of course, be modified. A mechanical arrangement substantially the same as that shown schematically in Fig. 1, however, is satisfactorily employed in actual practice. We are not primarily interested, however, in the detailed mechanical means of carrying out the invention.

Fig. 2 shows a simplified circuit of a modified electrical control. In this circuit we show a main generator armature 101 with a shunt winding 102, conductors 103 and 104 connected to the armature brushes in the usual way and a series winding 106. The driving motors and armatures 107 and 108 with field windings 109 and 111 respectively. The armatures of the motors are connected directly to the conductors 103 and 104 and the field winding 109 and 111 are series connected in a circuit including an exciter armature 112 preferably coupled by a shaft 113 to the main generator. As in the main figure, both of the armatures are preferably directly driven by a suitable source of mechanical power such as an internal combustion engine.

The exciter 112 has a field 114 connected directly in the motor armature circuit and so designed as to carry the entire armature current.

According to our invention, we control the value of the field winding 114 to modify the excitation of the exciter armature 112. To this effect, a resistance 116 has one terminal connected on one side of the series winding 114 and an adjustable contact 117 is provided, one side of the contact being connected to the opposite side of the series winding and the contact adapted to cut in or out in selected number of turns of the resistance 116. The resistance 116 therefore functions as a shunt and the value of resistance in ohms determines the proportion of the current that flows through the series winding 114. This contact 117 may be automatically adjusted by means similar to that described in connection with Fig. 1.

The simplified circuit described in Fig. 2 in principle is the same as that shown in Fig. 1. We have found, however, that for all practical purposes, this manner of controlling the series winding 114 is not as satisfactory as that shown in Fig. 1 in which the corresponding winding 27 carries only a portion of the main armature current. In order to carry the entire armature current, the series winding 114 must be of low resistance and we have found that the contact resistance between the adjustable contact 117 and the shunt resistance 116 in some conditions may be almost as great as the entire resistance of the winding 114. When the resistance of the winding is low, it becomes difficult to obtain full satisfactory control thereof, in what might be termed the basic circuit.

Fig. 3 shows a still more simplified manner of control. Only so much of the circuit is shown as is included directly in the conductor 204 which corresponds with the conductor 104 of Fig. 2. A series winding 214 functions as the main field winding of the exciter and an adjustable contact 217 is adapted to make electrical contact with any one of a number of taps 218 each connected to a winding of the series coil. The adjustable contact 117 may be controlled by means similar to that shown in Fig. 1. Although this provision shown in Fig. 3 is the simplest means of control obtainable, it is not as satisfactory from a practical point of view. A field winding in a generator is so housed as to make it difficult to obtain proper electrical and structural characteristics if portions of the field winding are adapted to be cut off as shown in Fig. 3. By means of the arrangement in Fig. 1, standard generator and field coil construction may be employed and the current to the standard type of field winding controlled by a separate resistance which resistance carries a major portion of the motor armature current.

The principle employed throughout is the same, particularly in Figs. 1 and 2. In both of these embodiments, a field coil and a resistance are in parallel relationship with each other and in series with the generator armature circuit. In Fig. 1, however, for simplicity of control, the shunt resistance carries a major portion of the current.

Figs. 1 and 2 illustrate the use of our improved control means for a motor having a separately excited field and in which the generator or exciter supplying current to said field has its own field modified directly in accordance with the current in the main generator armature circuit. In Fig. 4 we show still another means of employing the control mechanism with a shunt wound motor having a self-excited field. A main generator 121 is driven from a suitable source of power, as for example a gasoline engine, and has a suitable field coil 122 indicated as shunted across the armature brushes. A load driving motor 123 is connected into the armature circuit and has a shunt wound field 124. The control motor has an armature 126 carrying a control arm 127 which makes contact with a field control rheostat or resistance 128. A conductor 129 has one terminal connected to the control arm 127 and the other to the armature circuit in such a way as to connect the rheostat 128 in series with the field 124 and both of them shunted across the armature. A current coil 131 in series with the armature circuit forms one field of the control motor while a potential coil 132 connected across the armature circuit functions as the second field coil. The two coils are mounted with their poles opposed, as described in connection with the main figures, so that the armature 126 is turned in either direction as determined by the load on the armature 123. Resistance is thereby cut into or out of the motor field circuit in accordance with the load on the armature. The field is, therefore, automatically increased when the load is increased, and is automatically decreased when the load is decreased.

Fig. 5 shows an arrangement somewhat similar to Fig. 1, except for the arrangement of the exciter and the manner in which the motor field is controlled. In this embodiment, a generator armature 136 has a shunt wound field 137 and carries the armature 138 of the load driving motor in series with it. A second generator armature 139, which we have termed an exciter, has a shunt field 141 and is preferably driven from the same source of power as the main generator armature. The exciter armature has the motor field coil 142 in series with it and also a field rheostat 143. The control motor armature 144 has a control arm 146 co-operating with the field rheostat to modify the current value of the motor field coil. The control motor armature is controlled in the same way as in the preceding figures, a current coil 147 and potential coil 148 being provided having opposite polarities and adapted to drive the control motor armature in either direction. In this form, the exciter field is not affected by the changes in the main generator armature circuit, but by means of the control of the exciter armature circuit through the rheostat substantially the same characteristics are obtainable in the load driving motor as in Fig. 1. Thus it is an inherent characteristic of Figure 5 that whenever the current is excessive, the field 147 will overbalance the field 148 and the control armature 144 will keep turning to increase the motor field 142 until the current is thus reduced to the desired value. In the same way in Fig. 4 the armature 126 will necessarily keep turning, if the current is too heavy, until the motor field 124 is strengthened enough to reduce the current to the desired value. In Figs. 4 and 5, the range and smoothness of automatic control are limited by the number and size of the steps in the control rheostat (128 or 143), while in Fig. 1 field coil 27 produces some compensation for variations too small to be exactly corrected by the steps of the resistance 29, or beyond its maximum range.

What we claim is new and desire to protect by Letters Patent of the United States is:

1. In a mechanical electrical drive system, a motor having an armature winding and a main field winding, a generator supplying current to said armature winding, an exciter furnishing operating current to said motor field winding, said exciter having an operating field winding directly supplied with current by said generator, both the generator and exciter having mechanically coupled armatures, and means acting in response to changed current conditions in the motor armature circuit for controlling the proportion of the motor armature current supplied to said exciter field winding.

2. The combination defined in claim 1 including an impedance, and means for connecting the exciter field winding and said impedance in parallel with each other and in series in the motor armature circuit, said current controlling means functioning to change said impedance.

3. The combination defined in claim 1, wherein said current controlling means includes a relatively small control motor having a pair of field windings with reverse polarities responsive to the changed current conditions in the motor armature circuit, whereby said motor is turned in either direction in response to the difference in value of the opposed fields of said windings, and means controlled by said motor for modifying the flow of current to said exciter field winding.

4. The combination defined in claim 1, including an auxiliary battery exciter field winding for said exciter, and means responsive to changed current conditions in the motor armature circuit for controlling the battery current to said auxiliary field winding.

5. The combination defined in claim 1 wherein said generator has a shunt field winding and series field winding, and an auxiliary battery field winding for preventing a reversing of polarity in the generator.

6. The combination defined in claim 1, wherein said current controlling means includes a control motor having one field winding connected across the motor armature circuit and a second field winding in series in the motor armature circuit, said windings having opposite polarities, a control motor armature adapted to turn in either direction in response to energization of said field windings, and means controlled by movement of said armature for modifying the current supply to said exciter field winding.

7. In a mechanical electrical drive system, a motor having an armature winding and a field winding, a generator supplying current to said armature winding, an exciter supplying current to said field winding, said exciter having a field winding, a resistance, means for connecting said exciter field winding and resistance in parallel with each other and in series in said motor armature circuit, and means responsive to changed current conditions in said motor armature circuit for increasing or decreasing said resistance to control the value of said exciter field winding.

8. The combination defined in claim 7, including a control motor having an armature and field windings having opposed polarities, one of said field windings connected across the motor armature circuit and the other field winding in series with said resistance, whereby said control armature is adapted to be driven in either direction by said field windings, and means actuated by said armature for increasing or decreasing the amount of said resistance.

9. In a mechanical electrical drive system, a motor having an armature winding and a field winding, a generator supplying current to said armature winding, an exciter supplying current to said field winding, said exciter having a main field winding and auxiliary battery field winding, a resistance, means for connecting said main exciter field winding and said resistance in parallel with each other and in series in the motor armature circuit, and a control motor for controlling the amount of current to said main exciter field winding, and to said battery winding, said control motor including a field winding connected across the motor armature circuit, a second field winding in series with the armature circuit, said control motor field windings having opposed polarities, a control motor armature adapted to be turned in either direction by said field windings, and means actuated by said control motor armature for increasing or decreasing the amount of said resistance in parallel relationship with the exciter field winding whereby the amount of current supplied to said exciter field winding is controlled.

10. The combination defined in claim 9, including means actuated in response to movement of the control armature for delivering battery current to said exciter auxiliary field winding.

11. The combination defined in claim 9, including means actuated in response to movement of the control motor armature for delivering battery current to said exciter auxiliary field winding, a battery having its terminals connected to the motor armature circuit in parallel with at least a portion of said control resistance, and means also actuated in response to movement of said control armature for increasing or decreasing the amount of said resistance connected across the battery terminals whereby the charging rate of said battery is controlled.

12. In a mechanical electrical drive system, a generator including an armature, mechanical means for driving said generator, a load driving motor having a field winding and armature, said armature electrically connected into the generator armature circuit, a current controlling device in series with the generator armature, and means for controlling said current controlling device in response to current changes in said generator armature circuit for controlling the current in the motor field circuit.

13. In a mechanical electrical drive system, a generator including an armature, mechanical means for driving said generator, a load driving motor having a separately excited field winding and an armature, said armature electrically connected into a circuit including the generator armature, a resistance in series with said motor field winding, and a control motor for changing the value of said resistance, said control motor having one coil in series in said armature circuit and another coil connected across said armature circuit, said coils having opposed polarities, whereby said control motor armature is rotated in either direction in response to the load on the load driving motor.

14. In a mechanical electric drive system, a generator, a motor with an armature and field coil having its armature directly connected to the generator armature resulting in a generator-motor armature circuit, an exciter supplying power to the motor field coil, said exciter having a field winding supplied with power by the generator armature circuit whereby excitation of the exciter field winding is proportional to the load on the motor, and separate means automatically controlled by the current flow in the generator motor armature circuit for modifying the value of said exciter field winding whereby the proportion of excitation of the exciter field winding may be increased with respect to rise in current in the motor armature circuit, and decreased with decrease in current in the motor armature circuit.

15. In a mechanical electric drive system, a generator, a motor with an armature and field coil having its armature directly connected with the generator armature circuit, an exciter having an armature in series with the motor field coil whereby to supply power to said motor field coil, a resistance in said motor generator circuit, an exciter field coil having its terminals connected in parallel with said resistance whereby said field coil is excited in predetermined proportion to the current flowing in said generator armature circuit, and means automatically responsive to the current flow in the generator motor armature circuit for changing the resistance between the terminals of said exciter field coil whereby to excite said exciter field coil out of said predetermined proportion.

16. A mechanical electric drive system, as defined in claim 15, including a control motor having one field coil connected to receive current from the circuit supplying current to said motor armature circuit and a second field coil paralleling said circuit, said coils having opposed polarities, whereby the coil offering the strongest field will drive the control motor armature, and mechanical means for modifying said resistance in response to operation of said control motor.

17. A mechanical electric drive system, as defined in claim 15, including a control motor having one field coil connected to receive current from the circuit supplying current to said motor armature circuit and a second field coil paralleling said circuit, said coils having opposed polarities, whereby the coil offering the strongest field will drive the control motor armature, mechanical means for modifying said resistance in response to operation of said control motor, and a separate battery field coil associated with said control motor for driving said control motor armature when the first two field coils are unenergized to place the maximum amount of resistance between the terminals of the exciter field coil.

18. In a system of the class described, the combination with a motor having an armature, a field winding, and a main generator for supplying power to the armature of said motor, said main generator being subject to a decrease of output voltage under load, of an exciter generator having a field winding and an armature for energizing the field winding of said motor, a third source of electrical energy, and means operable in response to a reduction of voltage of the main generator caused by heavy loads on said motor and main generator for providing a component of excitation for the field winding of said exciter generator from said third source of electrical energy whereby to increase progressively the excitation of said motor field winding to compensate for said decrease of output voltage of said main generator.

19. In a system of the class described, the combination with a motor having an armature and a field winding, a main generator for supplying power to the armature of said motor and a prime mover for driving said main generator, said prime mover being subject to a decrease of speed under load so as to reduce the output voltage of said generator, of an exciter generator for supplying power to the field winding of said motor, said exciter generator having a field winding, means for supplying a component of excitation to the field winding of said exciter generator from said main generator in accordance with the load on said main generator, and means for supplying an additional component of field excitation to a field winding of said exciter generator in response to conditions imposing a heavy load on said prime mover whereby to compensate for the loss of speed of said prime mover under heavy loads so as to prevent a corresponding loss of torque in the motor under heavy loads.

20. In a mechanical electrical drive system, a motor having an armature winding and a main field winding, a generator for supplying current to said armature winding, an exciter for supplying current to said field winding, said exciter for supplying current to the motor field winding having a field winding in series with the motor armature, and means acting in response to changed current conditions in the motor armature circuit for controlling the current value in the motor field winding in excess of the control that would be exerted by the inherent effect of said changed current conditions on the exciter field windings.

21. The system defined in claim 20 wherein said means is controlled to cause the motor field current to increase as the armature current increases, but in proportion at a greater rate than the said armature current.

22. In a mechanical electrical drive system, a generator including an armature, mechanical means for driving said generator, a load driving motor having a field winding and an armature, said armature electrically connected into a circuit including the generator armature, a control motor having an armature and a pair of field coils having opposed polarities, one of said coils being a current coil responsive to the current in the driving motor armature circuit and the other potential coil responsive to potential across the driving motor armature terminals, and means operated by the control motor armature for controlling the field winding of the driving motor.

23. In a mechanical electrical drive system, a generator including an armature, mechanical means for driving said generator, a load driving motor having a shunt field winding and an armature, said armature electrically connected into a circuit including the generator armature, a resistance in series with said motor field winding, and a control motor for changing the value of said resistance, said control motor having one coil in series in said armature circuit and another coil connected across said armature circuit, said coils having opposed polarities, whereby said control motor armature is rotated in either direction in response to the load on the load driving motor.

24. In a mechanical electric drive system for vehicles, the combination of a driving motor having an armature and field winding, a main generator for supplying power to the armature of said motor, a prime mover for driving said generator, and means for causing said generator and prime mover to operate at approximately a predetermined speed when under heavy loads comprising means for automatically increasing the excitation of said field winding when the voltage of said generator is reduced below a predetermined value due to high current load, and for automatically augmenting the increase until it is sufficient to permit said voltage to return approximately to said predetermined value.

25. In a mechanical electric drive system for vehicles, the combination of a driving motor having an armature and field winding, a main generator for supplying power to the armature of said motor, a prime mover for driving said generator at ineffective idling speeds and accelerating it to normal operating speeds, an exciter also driven by the prime mover, for supplying power to the field winding of said motor, and having a field winding, means for partially energizing the field winding of said exciter at idling speeds whereby the field winding of the motor is energized at least as soon as said generator and exciter are speeded up beyond the idling speed by said prime mover, and means for further energizing said exciter field winding in proportion to the current supplied to said motor by said generator and for changing this proportion.

26. In a mechanical electric drive system for vehicles, the combination of a driving motor having an armature and field winding, a main generator for supplying power to the armature of said motor, a prime mover for driving said generator at ineffective idling speeds and accelerating it to normal operating speeds, an exciter also driven by the prime mover for supplying power to the field winding of said motor, and having a field winding, means for partially energizing the field winding of said exciter at idling speeds whereby the field winding of the motor is energized at least as soon as said generator and exciter are speeded up beyond the idling speed by said prime mover, and means for energizing the field winding of said generator continually at all speeds whereby the load will be placed on the generator and prime mover smoothly, beginning substantially as soon as said prime mover begins to speed up said generator.

27. The combination of a load driving motor having an armature and a field winding, a generator for supplying current to said armature, an exciter for supplying current to said field winding, said exciter having an armature and an exciter field winding, and means for automatically exciting said exciter field winding with successively higher or successively lower intensities as the current supplied to said motor armature exceeds and remains even slightly above a predetermined value or drops below and remains even slightly below a predetermined value respectively, said means increasing or decreasing said intensities enough to cause the current supplied to the motor armature to return substantially to the predetermined value which it exceeded or dropped below.

28. The combination of a load driving motor having an armature and a field winding, a generator for supplying current to said armature, an exciter for supplying current to said field winding, said exciter having an armature and an exciter field winding, and means for exciting said exciter field winding with successively higher or successively lower intensities as the current supplied to said motor armature exceeds a predetermined value or drops below a predetermined value respectively, said means comprising adjusting means operable in opposite directions for adjusting the intensity of said exciter field winding, and a control motor for driving said adjusting means, said motor including a control armature, means tending to rotate said armature in a field decreasing direction, and a magnetic coil energized by a current proportional to the driving motor armature current tending to rotate said control armature in a field increasing direction.

29. In a mechanical electrical drive system, a generator including an armature, mechanical means for driving said generator, a load driving motor having a field winding and an armature, said armature electrically connected into a circuit including the generator armature, a control motor having an armature and a pair of field coils having opposed polarities, one of said coils being a current coil responsive to the current in the driving motor armature circuit and the other being a potential coil responsive to potential across the driving motor armature terminals, and means operated by the control motor armature for controlling the field of the driving motor and urged in a field increasing direction by the current coil, and in a field decreasing direction by the voltage coil.

30. A combination of a load driving motor, a generator for supplying current to said motor, a field coil for energizing said generator, a battery for energizing said field coil, and an impedance in the circuit from said generator to said motor; said battery and field coil being connected in parallel across said impedance for energizing said battery and for supplying current from said impedance to said field coil.

31. In a mechanical electric drive system for vehicles, a motor having armature and field coils, means comprising a generator normally driven at various speeds for supplying current to the armature, and an exciter having a field winding controlled by the voltage drop across an impedance in series with the generator and motor armatures inherently responsive to flow of current supplied to the motor armature for supplying current to the motor field coil in any predetermined proportion to that supplied to the armature, and means for varying that proportion to effect a wide range of speed and torque for said motor while retaining the armature current approximately constant.

32. In a mechanical electric drive system for vehicles, a motor having armature and field coils, means comprising a generator normally driven at various speeds for supplying current to the armature, and an exciter having a field winding controlled by the voltage drop across an impedance in series with the generator and motor armatures inherently responsive to flow of current supplied to the motor field coil in any predetermined proportion to that supplied to the armature, and control means operative through successive movements each making the control means more effective than before for varying that proportion to effect a wide range of speed and torque for said motor while retaining the armature current approximately constant.

33. In a mechanical electrical drive system, a motor having an armature winding and a main field winding, a generator for supplying current to said armature winding, means for supplying current to said field winding, and means acting in response to a decrease of the voltage across the armature winding or an increase of the current in the armature winding from a predetermined relationship for increasing the current in the field winding by an amount substantially independent of the amount of said increase or decrease.

34. The combination of a load driving motor having an armature and a field winding, generator means for supplying current to said armature and field winding, and automatic means operative through successive movements to positions which are successively advanced each beyond its predecessor for varying the current supplied to the field winding to energize it with successively increased or successively decreased current values as the current supplied to said motor armature exceeds or drops below a predetermined value respectively.

MATTHEW ERNST.
HARRY B. HOLTHOUSE.